Sept. 24, 1963
H. G. ADLER
SPEED ALERTER
3,105,222
Filed Jan. 15, 1958
3 Sheets-Sheet 2
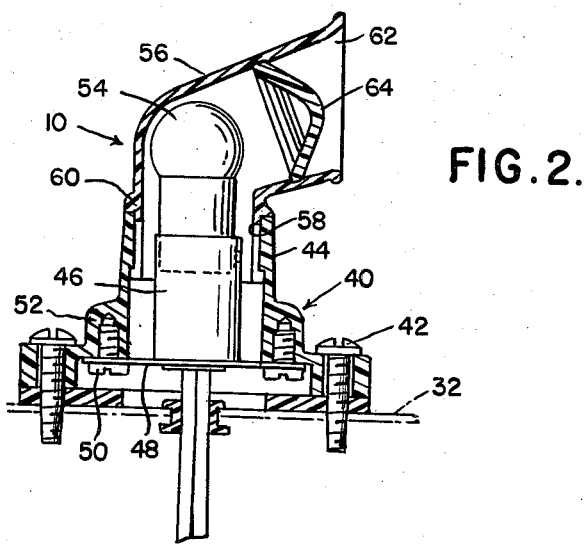
FIG. 2.
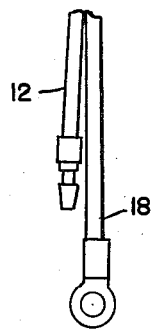
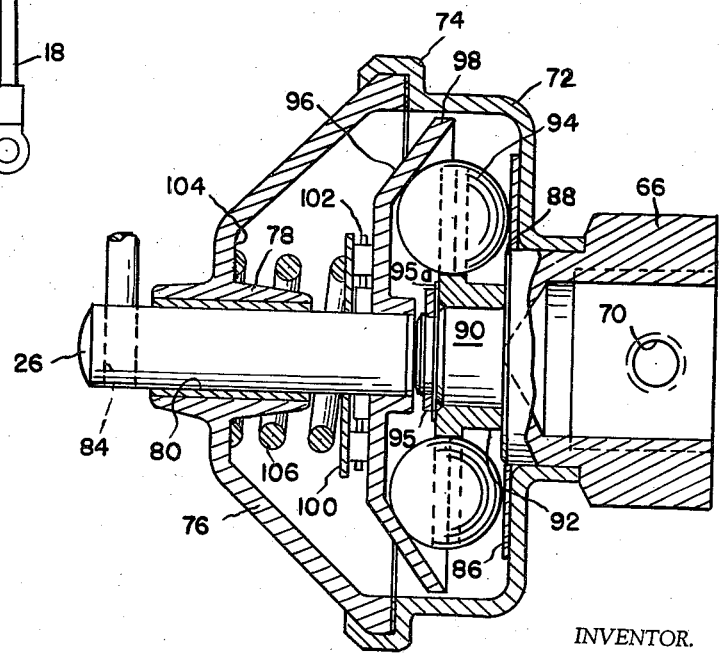
FIG. 3.
INVENTOR.
HERMAN G. ADLER
BY
*Whittemore, Hulbert & Belknap*
ATTORNEYS Sept. 24, 1963  H. G. ADLER  3,105,222
SPEED ALERTER
Filed Jan. 15, 1958  3 Sheets-Sheet 3
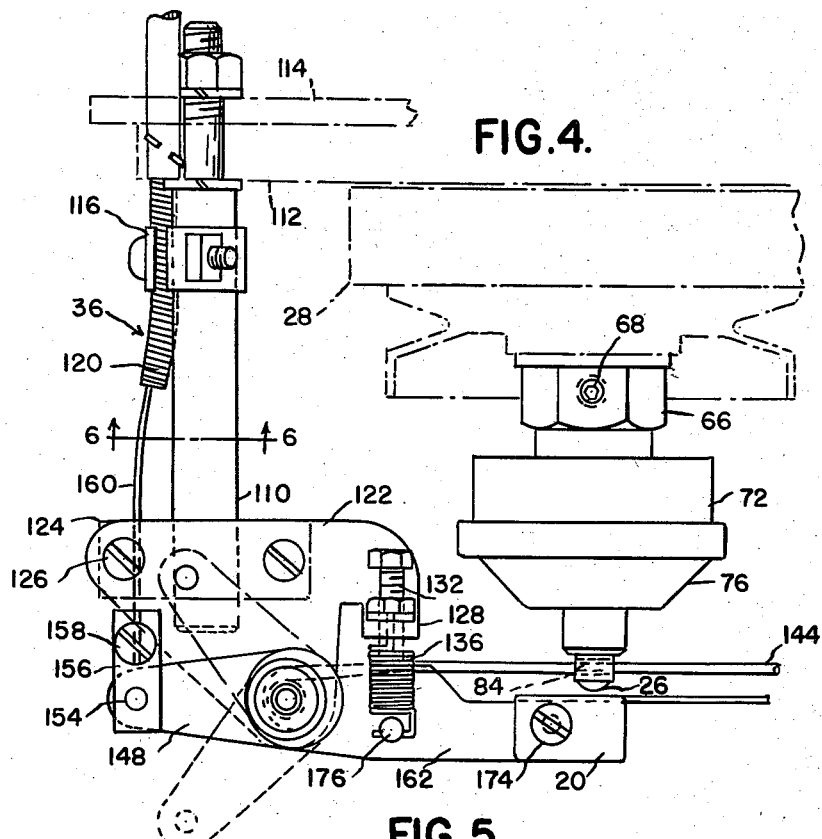
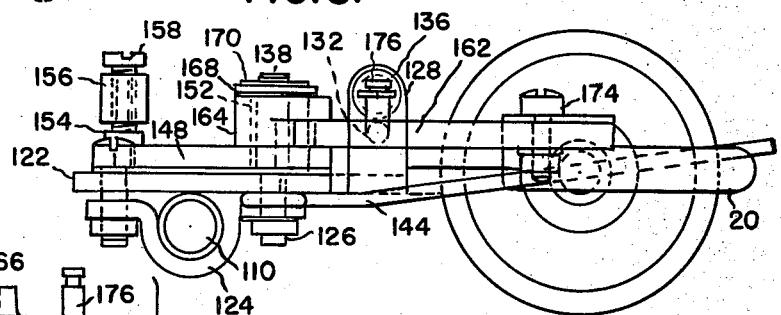
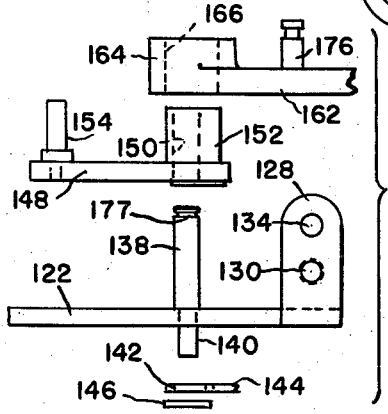
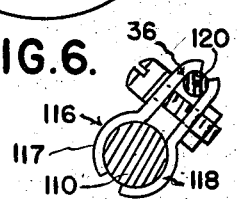
INVENTOR.
HERMAN G. ADLER
BY
Whittemore, Hulbert & Belknap
ATTORNEYS

United States Patent Office 3,105,222
Patented Sept. 24, 1963

3,105,222
SPEED ALERTER
Herman G. Adler, Detroit, Mich., assignor, by mesne assignments, to Continental Motors Corporation, a corporation of Virginia
Filed Jan. 15, 1958, Ser. No. 709,089
6 Claims. (Cl. 340—54)

The present invention relates to a speed alerter.

It is an object of the present invention to provide a system actuated by engine speed adapted to signal the operator of a motor vehicle when a preset speed is reached.

More particularly, it is an object of the present invention to provide an adjustable speed signaling system for an automobile having a speed responsive device adapted to be connected to a part of the vehicle which rotates at a speed determined by engine speed, such for example as the generator.

It is a further object of the present invention to provide a system of the character described including means adapted to be mounted on the dashboard of the vehicle to adjust the speed setting at which the signal is to operate.

It is a further object of the present invention to provide a setting adjustment for a system of the character described capable of producing extremely fine and accurate adjustment of the speed setting.

It is a further object of the present invention to provide a speed signaling system of the character described in which the signal is a warning light adapted to be mounted above the instrument panel and including a shield rotatable thereon to accentuate or diminish the effectiveness of the signal.

Other objects and features of the invention will become apparent as the description proceeds, especially when taken in conjunction with the accompanying drawings, illustrating a preferred embodiment of the invention, wherein:

FIGURE 2 is a sectional view through the light signal.

FIGURE 3 is a sectional view through the speed responsive component of the switch.

FIGURE 4 is a fragmentary side elevational view of the speed responsive unit and the means for adjusting the speed setting.

FIGURE 5 is an end view of the structure shown in FIGURE 4.

FIGURE 6 is a section on the line 6—6, FIGURE 4.

FIGURE 7 is an exploded view of the separate components of the speed adjuster.

Figure 1:
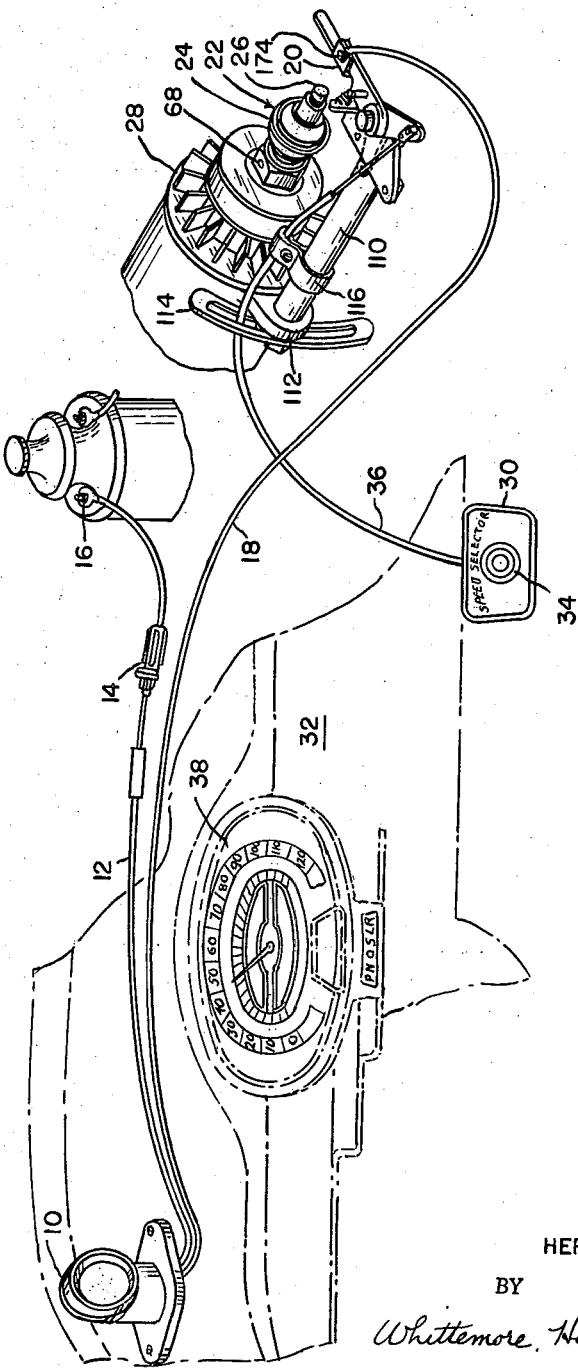
FIGURE 1 is a schematic view of the complete speed alerting system.

The speed alerter is adapted to notify the driver when he unintentionally exceeds the safe speed limit and makes it unnecessary for him to take his eyes off the road in order to check his speedometer. The speed alerter operates in response to engine speed, as contrasted with vehicle speed. When cruising on the highway, the speed alerter of course becomes essentially responsive to vehicle speed. However, when starting the vehicle in low gear ratios the speed alerter has the additional important function of warning the operator when acceleration is being accomplished at an uneconomical rate. By heeding the warning of the speed alerter during acceleration, the driver can enjoy considerable gas saving and reduced wear in the car, thereby reducing operating expense.

This device can be easily installed on any car in a few minutes and may be adjusted to turn on a signal light whenever a preselected speed is exceeded when the automobile transmission is in a cruising ratio or when acceleration in a lower gear ratio is at an excessive rate.

The speed at which the alerter will turn on the signal can be varied at will between 15 and 100 miles per hour by a simple movement of a knob installed within easy reach below the instrument panel of the vehicle.

Referring now to the schematic showing of FIGURE 1, the speed alerter comprises a signal light 10 having an electrical connector 12 including a fuse 14 to a terminal 16 which in turn is connected to the storage battery of the vehicle. As illustrated in the figure, the terminal 16 is on the distributor coil and hence the circuit of the speed alerting or signaling system is controlled by the ignition switch. A second electrical connector 18 extends to a terminal of a contact 20 on a speed responsive switch indicated generally at 22 which includes centrifugally actuated means 24 effective to move a second contact 26. Conveniently, the centrifugally actuated means 24 is secured to the shaft of the vehicle generator indicated in FIG. 4 by dotted lines at 28. Adjusting means for the speed responsive switch includes a speed selector 30 adapted to be mounted below the instrument panel indicated generally at 32 including a knob 34 connected to the wire element of a Bowden wire indicated generally at 36 and adapted to effect fine adjustment of stop means for the movable switch element as will subsequently be described.

Setting of the speed responsive switch to become operative at any desired speed is accomplished by operating the vehicle at the required speed as observed by the speedometer 38 and adjusting the knob 34 of the speed selector until the signal light is turned on. There is thus provided a simple means for adjusting a speed responsive switch which is not calibrated independently of the vehicle speedometer but which depends upon the vehicle speedometer for its accuracy. Since the vehicle speedometer is ordinarily employed to govern the speed of the vehicle, the foregoing method of adjustment provides means for adjusting the speed responsive signal to the speedometer. Thus, if throughout its life of service, changes occur in the vehicle speed-contact movement relationship, this is cancelled out by relating the speed adjustment in each instance to the observed vehicle speed as indicated by the speedometer.

Referring now to FIGURE 2 the construction of the signal light 10 is shown in detail. The construction comprises a base 40 adapted to be secured to the top of the instrument panel 32 as by assembly screws 42. The base 40 includes an upward tubular extension 44 in which a bulb socket 46 is mounted as by a plate 48 secured by screws 50 engaged in thickened bosses 52 of the base 40. The socket of course includes the light bulb 54. Rotatably received in the upper end of the tubular extension 44 of the base 40 is a shield 56 having a short downward tubular extension 58 received within the upper end of the tubular extension 44 and a shoulder 60 engageable with the top of the extension 44. The shield 56 is thus supported on the upper end of the extension 44 for rotation about its substantially vertical axis. The shield 56 includes a laterally extending flared portion 62 adapted to direct light laterally from the bulb 54 in a direction as determined by the adjustment of the shield. Thus, the operator of the vehicle may if he desires turn the shield so that the signal light is directed toward his eyes for maximum visibility. If preferred, it may be turned so that the signal light is directed away from his eyes but in such a direction as to be visible. Preferably, a transparent colored lens 64 is provided which will normally be colored red.

Referring now to FIGURES 1 and 3 it will be observed that the speed responsive switch 22 includes a movable contact 26 which was referred to as movable axially in accordance with changes in speed of the generator 28. This speed responsive switch comprises a nut 66 adapted to be screwed onto the threaded shaft of the generator 28 and to be locked thereon by a lock screw 68 received in a threaded opening 70 provided in the nut 66. Fixed to the nut is an inner housing portion 72 having an inwardly turned flange 74 at its outer edge engaging a complementary housing portion 76 which is provided with an elongated tubular flange portion 78. Received between the flange portion 78 and the contact member 26 is a bearing 80 to provide for rotation of the housing while the contact member 26 is prevented from rotation. In order to prevent rotation of the contact member 26 its end portion which projects beyond the outer end of the tubular flange portion 78 is provided with a transverse opening 84 adapted to receive a wire which prevents its rotation.

Fixed within the housing member 72 is a hardened plate constituting an inner ball race 86. Conveniently, the plate 86 may be staked as indicated at 88 to the housing member 72 to prevent relative rotation.

The forward end of the nut 66 is reduced as indicated at 90 and rotatable on this reduced end portion is a member 92 having generally radially extending slots in which are received the balls 94 which are the centrifugal elements of the switch. Intermediate a snap ring 95 is a thin laterally distorted friction washer 95a which transmits a light frictional pressure to the member 92.

Fixedly carried on the inner cylindrical portion of the contact member 26 is an outer ball race 96. The outer race 96 includes a conically inclined portion 98 engaged by the balls 94 so that radial outward movement of the balls in response to centrifugal forces developed by rotation of the generator shaft effects axial movement of the outer race 96.

Mounted on the inner cylindrical portion of the contact member 26 is a bearing plate 100 and between this bearing plate and the outer flat surface of the ball race 96 are a plurality of roller thrust bearings 102. Interposed between the bearing plate 100 and a seat 104 formed at the interior of the housing member 76 is a relatively strong compression spring 106 which opposes movement of the movable ball race 96 in response to centrifugal forces. From the foregoing it will be apparent that at any particular speed, which is represented by a corresponding thrust on the movable ball race 96 resulting from centrifugal forces acting on the balls, a position of balance is achieved in which this force is balanced by the force of the compression spring 106. Accordingly, at any particular engine speed the contact element 26 will have a corresponding position and will move axially in or out of the housing upon decreases or increases in engine speed.

Referring now to FIGURES 4–7 there is illustrated the mechanism for effecting accurate adjustment of the speed responsive switch. The adjusting mechanism is mounted on a threaded stud 110 which extends through a bracket 112 provided on the side of the generator 28 for the purpose of adjusting the generator relative to a slotted bracket 114 to maintain belt tension. Mounted on the stud 110 is a clamp 116 details of which are best seen in FIGURE 6. The clamp includes two complementary clamping elements 117 and 118 having portions shaped to grip the stud 110 and additional shaped portions to grip the flexible armored housing 120 of the Bowden wire indicated generally at 36.

Clamped to the stud 110 adjacent its outer end is a mounting bracket 122. Clamping is effected by the clamp 124 engaged by fastening elements 126 to the bracket 122 at opposite sides of the stud 110. At a position remote from the stud 110, the bracket 122 has a turned up ear 128 provided with a threaded opening 130 for receiving an adjustable abutment screw 132 and a second opening 134 for receiving a tension spring 136.

As best seen in exploded FIGURE 7 the bracket 122 is also provided with a pivot pin 138 having a reduced portion 140 extending through an opening in the bracket and adapted to receive the eye 142 of a wire 144 the other end of which extends through the opening 84 in the end portion of the contact member 26. The pin 138 is riveted in position, a washer 146 being provided outwardly beyond the eye 142 of the wire 144.

Mounted on the pivot pin 138 is an adjusting lever 148 having an opening 150 in which the pivot pin 138 is received, the opening 150 being provided eccentrically in a cylindrical stud 152. The adjusting lever 148 at its opposite end carries a pin 154 to which is pivoted a connector block 156 clamped as by a screw 158 to the outer end of the inner wire 160 of the Bowden wire 36. Since the armored cable or housing 120 of the Bowden wire is clamped by clamp 116, movement of the adjusting knob 34 effects swinging movement of the adjusting lever 148 and it is contemplated that the adjusting lever may have approximately 90 degrees of arcuate movement.

A contact arm 162 has an enlargement 164 at one end provided with a cylindrical opening 166 dimensioned to fit over the stud 152 carried by the adjusting lever 148. The contact arm 162 is retained in position on the stud 152 and the adjusting lever 148 is retained in position on the pivot pin 138 by a washer 168 retained in position by a spring clip 170 engageable in an annular groove 177 at the outer end of the pivot pin 138.

At the outer end of the contact arm 162 there is provided the contact element 20 which is secured thereto by a screw 174 adapted to engage the end of the electrical connector 18.

The contact arm 162 is provided with a pin 176 which engages the other end of the tension spring 136. Accordingly, as best seen in FIGURE 4, the spring 136 urges the contact arm 162 counterclockwise to a position in which its edge engages the inner end of the adjustable abutment screw 132. This positions the contact element 20 of the contact arm 162 at a predetermined distance from the outer end of the movable contact 26 when the engine is not running. Accordingly, it determines the speed which the engine must attain to move the movable contact member 26 outwardly into contact with the adjustable contact 20. Movement of the adjusting lever 148 about its axis results in movement of the end of the contact arm 162 which receives the eccentric boss 152 of the adjusting lever 148. The amount of eccentricity between the inner surface of the opening 150 and the outer cylindrical surface of the stud 152 may be relatively small so that the speed adjustment is not at all sensitive. As a corollary of this, the speed may be set with very considerable accuracy without requiring particular care on the part of the driver of the vehicle. From the foregoing it will be observed that a very simple speed signaling system has been provided which may be quickly and easily attached to existing components of an automobile. The signal is responsive to engine speed rather than vehicle speed and accordingly serves the additional function of providing a warning during acceleration if safe engine speed is exceeded.

Simple and highly accurate setting means are provided which employ as a guide in the particular setting the actual observed speedometer reading of the vehicle. This permits each setting of the particular signal to be correlated to actual vehicle speed and thus in effect, eliminates errors and deviations in speed setting which might otherwise occur.

Attention is directed to the fact that the speed responsive structure best illustrated in FIGURE 3 is particularly useful when applied to the shaft of the generator, since the generator operates at relatively high speed, as for example two and one-half times engine speed. Inasmuch as the race 96 is prevented from rotating and the member 92 is rotatable on the shaft 90, the balls receive the driving impulse from the race 86. Since this is applied to the periphery of the balls, the balls are driven in rotation as well as revolved about the axis of the shaft, and the speed at which the balls revolve about the axis of the shaft 90 is approximately one-half shaft speed. The device therefore operates as a self-contained speed reducer and permits the use of rigid and more efficient operating balls than would otherwise be the case.

A second advantage of the arrangement in which the balls are driven in rotation on the surfaces of the races 86 and 96 is that the balls are in constant rotation about inclined axes and hence there is no radial inertia to be overcome upon a change in speed. Consequently, the balls respond instantaneously to extremely small changes in shaft and hence, engine velocities.

The speed signal is in the form of a light signal and includes a shield or hood which is adjustable to vary the intensity of the signal as observed by the driver of the vehicle.

The drawings and the foregoing specification constitute a description of the improved speed alerter in such full, clear, concise and exact terms as to enable any person skilled in the art to practice the invention, the scope of which is indicated by the appended claims.

What I claim as my invention is:

1. In a speed alerter for an automobile having an engine and a rotating part driven at a speed at a constant proportion of the speed of said engine,
   (a) a centrifugal device rotatably drivingly connected to the rotating part,
   (b) said device having centrifugal mechanism axially movably actuated by said rotating part and a movable switch contact operably connected to said centrifugal mechanism,
   (c) a second contact adjustable along the path of movement of said movable contact,
   (d) means accessible to the driver of the automobile for adjusting said contact,
   (e) a signal light electrically connected to said contacts and being operable to produce a visible signal when said movable contact engages said second contact,
   (f) said centrifugal device comprising a housing in which said mechanism is received,
   (g) said housing and said mechanism being rotatable as a unit, and
   (h) said movable contact extending from said housing and being provided with means exterior of said housing to prevent rotation thereof.

2. In a speed alerter for an automobile having an engine and a rotating part driven at a speed at a constant proportion of the speed of said engine,
   (a) a centrifugal device rotatably drivingly connected to the rotating part,
   (b) said device having centrifugal mechanism axially movably actuated by said rotating part and a movable switch contact operably connected to said centrifugal mechanism,
   (c) a second contact adjustable along the path of movement of said movable contact,
   (d) means accessible to the driver of the automobile for adjusting said contact,
   (e) a signal light electrically connected to said contacts and being operable to produce a visible signal when said movable contact engages said second contact,
   (f) said second contact being mounted on a pivoted contact arm,
   (g) an abutment engageable by said arm,
   (h) a spring urging said arm toward said abutment, and
   (i) a pivoted adjusting lever having an eccentric pivot support thereon on which said contact arm is mounted.

3. An alerter as defined in claim 2 comprising a Bowden wire connecting said adjusting lever to the adjusting means accessible to the driver.

4. In an engine speed signalling system for an automotive vehicle, a speed responsive switch actuator comprising an actuating element movable in accordance with changes in speed, normally open switch means comprising a pair of relatively movable contacts, one of said movable contacts being operably connected to said actuating elements and being operable to move into engagement with said other contact to close the switch means upon a predetermined engine speed being reached, and manually actuated means for adjusting said switch comprising a first lever having a stud disposed eccentrically of its pivot axis, a second lever connected to one of said switch contacts and having an opening receiving said stud, a fixed abutment engageable by said second lever to limit swinging movement of said second lever in a direction causing approach of said contacts, resilient means connected to said second lever urging it toward said abutment, said switch actuator being movable in a direction to cause movement of said second lever away from said abutment upon an increase in speed following engagement of said contacts.

5. A system as defined in claim 4 in which said first lever has a Bowden wire connected thereto leading to a position convenient to the driver of said automobile for adjusting said first lever.

6. A switch for a speed signal designed for use with an automobile having a generator provided with a governor shaft provided with an accessible end, the generator having an apertured ear for receiving a clamping bolt adapted to enter a slotted bracket to adjust the generator, said switch comprising an elongated stud having a threaded end to replace the clamping bolt, an adjustable contact supported by said stud in a position beyond the end of the generator shaft, a centrifugal device adapted to be fixed to the end of the generator shaft and including a contact movable axially of the shaft upon changes in shaft speed into and out of engagement with said adjustable contact and means for selectively adjusting the position of said adjustable contact with respect to said centrifugal device contact whereby the shaft speed at which said centrifugal device contact will engage said adjustable contact can be selectively varied.

References Cited in the file of this patent

UNITED STATES PATENTS

| | | |
|---|---|---|
| 848,292 | Dawson | Mar. 26, 1907 |
| 1,239,720 | Preddey | Sept. 11, 1917 |
| 1,308,275 | Borger | July 1, 1919 |
| 1,594,734 | Jacobi | Aug. 3, 1926 |
| 1,647,374 | Robinson | Nov. 1, 1927 |
| 1,767,146 | Lee | June 24, 1930 |
| 2,481,829 | Digman et al. | Sept. 13, 1949 |
| 2,575,928 | Preston | Nov. 20, 1951 |
| 2,598,481 | Young | May 27, 1952 |
| 2,638,518 | Randol | May 12, 1953 |
| 2,639,135 | Sloan | May 19, 1953 |
| 2,738,968 | Fleischel | Mar. 20, 1956 |
| 2,757,251 | Ingres | July 31, 1956 |
| 2,786,668 | Adler | Mar. 26, 1957 |
| 2,786,921 | List | Mar. 26, 1957 |
| 2,797,404 | Hollins | June 25, 1957 |
| 2,804,515 | Heggens | Aug. 27, 1957 |
| 2,825,048 | Jaynes | Feb. 25, 1958 |
| 2,833,877 | Acierno | May 6, 1958 |
| 2,857,488 | Haley | Oct. 21, 1958 |
| 2,887,679 | Curva | May 19, 1959 |

FOREIGN PATENTS

| | | |
|---|---|---|
| 528,000 | Great Britain | Oct. 21, 1940 |
| 468,062 | Canada | Sept. 12, 1950 |